June 30, 1970  J. O. TRIMBLE ETAL  3,518,359
HEAT-SHRINKABLE SEALING AND STRAIN-RELIEF FITTINGS
FOR ELECTRICAL CABLES
Filed March 28, 1968  2 Sheets-Sheet 2
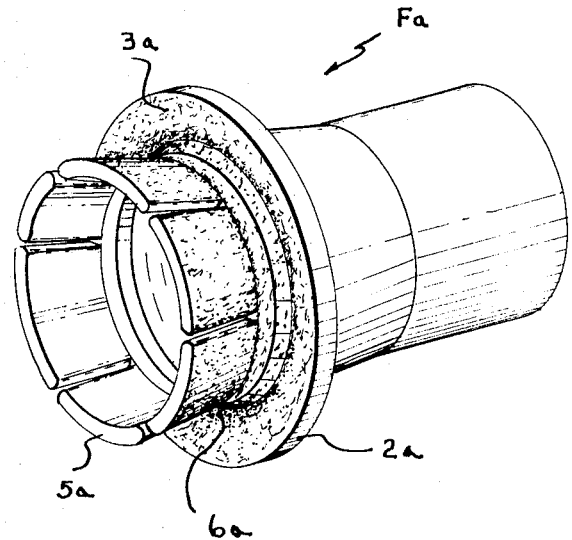
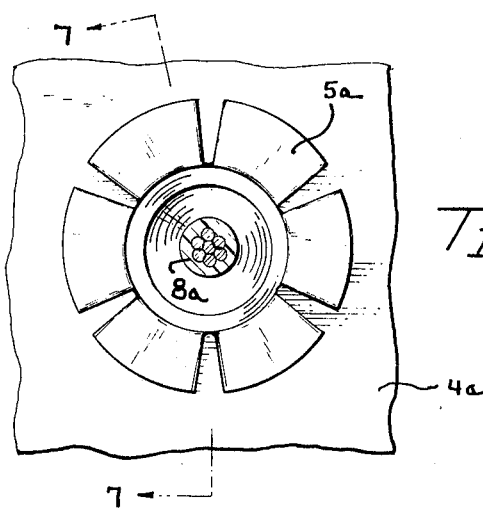
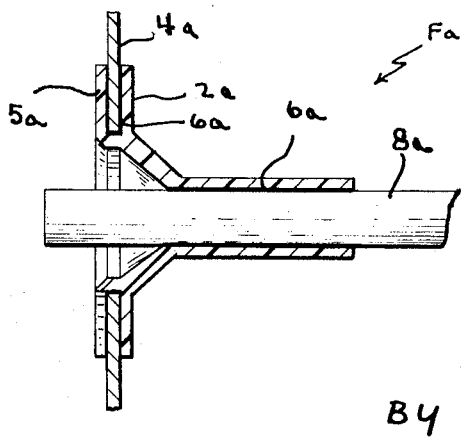
INVENTOR
JOHN OMER TRIMBLE
ARTHER LLEWELLYN MUELLER
BY Adrian J. LaRue United States Patent Office 3,518,359
Patented June 30, 1970

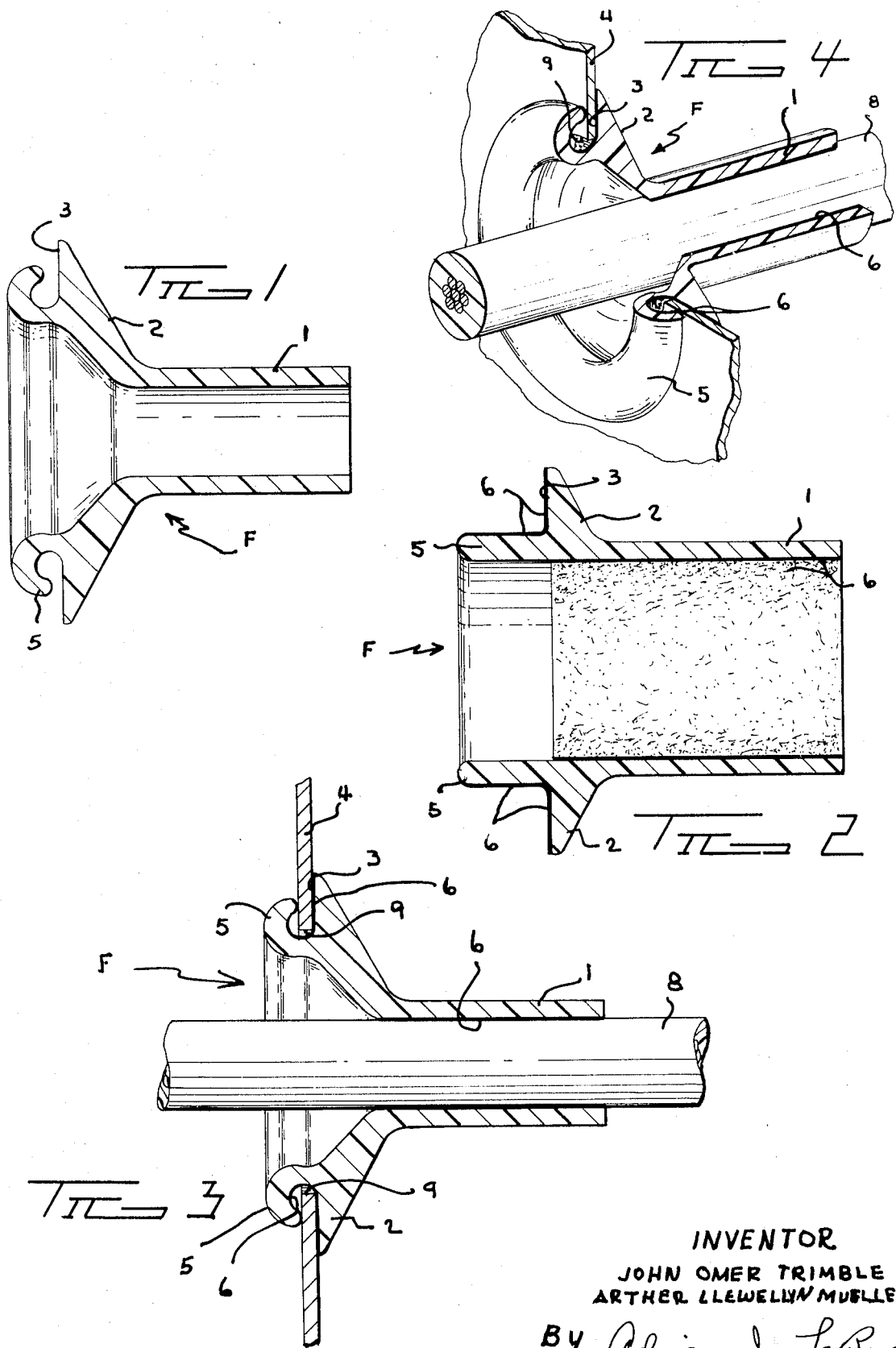

3,518,359
HEAT-SHRINKABLE SEALING AND STRAIN-RELIEF FITTINGS FOR ELECTRICAL CABLES
John Omer Trimble, Malvern, and Arthur Llewellyn Mueller, Berwyn, Pa., assignors to AMP Incorporated, Harrisburg, Pa.
Filed Mar. 28, 1968, Ser. No. 716,905
Int. Cl. H01b 17/30; F16l 5/02; B23p 11/02
U.S. Cl. 174—153                    8 Claims

ABSTRACT OF THE DISCLOSURE

A fitting for sealingly engaging an opening in a mounting member and an electrical cable passing therethrough comprises a tubular member of heat-shrinkable material having a flange extending outwardly from the tubular member adjacent one end, the exterior surface of the flanged end of the tubular member and an interior surface of the tubular member from the flange to the other end having sealant material thereon, the flanged end of the tubular member and the section of the tubular member having the sealant material on the interior surface being shrinkable into engagement with the area of the mounting member around the opening and into engagement with the part of the cable passing through the fitting so as to provide strain-relief therefor.

---

This invention relates to fittings and more particularly to sealing fittings for sealing to an electrical cable passing through an opening in a mounting member and to provide strain-relief therefor.

Electrical cables pass through bulkheads, into various electrical housings and into various electrical machines and equipment. It is desirable and also in some cases necessary to seal the passage of the cables into the electrical houses, machines and equipment in order to keep out dirt and moisture since these contribute to possible malfunctions. In the passage of cables through bulkheads, sealing is always desirable and in some cases necessary. The sealing should be concomitant with strain relief in order to preclude strain on connections in the case of electrical houses, machines and equipment and on the cables per se in the case of passage through bulkheads.

An object of the invention is the provision of a sealing and strain-relief fitting for sealingly engaging an opening in a mounting member and for sealingly engaging a cable disposed therein.

Another object of the invention is to provide a sealing and strain-relief fitting which is reducible in size via the application of heat thereon.

A further object of the invention is the provision of a sealing and strain-relief fitting which sealingly engages a range of sizes of cables.

An additional object of the invention is to provide a sealing and strain-relief fitting that provides strain relief between a cable disposed in the fitting and after the fitting has been sealingly brought into engagement with the cable and the mounting member.

Other objects and attainments of the present invention will become apparent to those skilled in the art upon a reading of the following detailed description when taken in conjunction with the drawings in which there are shown and described illustrative embodiments of the invention.

In the drawings:

FIG. 1 is a cross-sectional view of a sealing and strain-relief fitting in its originally molded condition;

FIG. 2 is a cross-sectional view of the fitting of FIG. 1 in an expanded condition;

FIG. 3 is a view similar to FIG. 1 with the fitting reduced in size in sealing engagement with an opening of a mounting member and onto a cable;

FIG. 4 is a view similar to FIG. 3 but in perspective and partial section;

FIG. 5 is a perspective view of an alternative embodiment;

FIG. 6 is a front elevational view of the embodiment of FIG. 5 in position in an opening of a mounting member and in engagement with a cable; and FIG. 7 is a view taken along lines 7—7 of FIG. 6.

Turning now to the drawings, FIGS. 1 through 4 illustrate a sealing and strain-relief fitting F comprising a tubular cable-engaging section 1 and a mounting member-engaging section 2. Section 2 defines a flange provided with a surface 3 for engaging one side of a mounting member 4, as illustrated in FIGS. 3 and 4, and a securing member 5 which extends outwardly from surface 3. Securing member 5 is curled so that the free end thereof is directed back towards surface 3.

Fitting F is made from a conventional cross-linkable plastic material which may be, for example, ethylene copolymers, various polyethylenes and various polyolefins or the like. Thermoplastic ematrial, when cross-linked, converts to a thermoset elastomer, the melt index of the material disappears thereby rendering this material nonremoldable. When stretched, this material is stable at ambient conditions, creepage occurs only at an elevated temperature, and this temperature depends upon the type of material used. Cross-linked thermoplastic material can be stretched to greater than its original size, and, upon the application of heat, the material will reduce to its original size.

Fitting F is molded, as illustrated in FIG. 1, via conventional molding techniques and, under the application of heat, cable-engaging section 1 is expanded to a size greater in diameter than its original diameter and securing member 5 is stretched to assume a tubular configuration as illustrated in FIG. 2. Conventional sealing material 6 is applied on the interior surface of section 1 and on surface 3 and the exterior surface of securing member 5. As can be discerned, fitting F has selected sections increased in size.

In use, fitting F is loosely placed on cable 8 and the fitting and cable are positioned relative to each other with respect to the passage through aperture 9 in mounting member 4. Ftting F is then heated in accordance with conventional heating techniques causing section 1 to reduce in size toward its original configuration and in tight and sealed engagement with cable 8 while securing member 5 reverts back toward its original configuration causing it to sealingly engage one side of mounting member 4 while surface 3 engages the other side in a sealed manner. Fitting F, as illustrated in FIGS. 3 and 4, is now in sealed engagement with cable 8 and mounting member 4 thereby providing a sealed connection for the cable through mounting member 4. The sealing material on surface 3 and securing member 5 enhances the connection with the mounting member. The tight engagement between section 1 and cable 8 is such that a strain-relief is provided between the fitting and the cable.

Of course, fitting F could be secured in opening 9 by applying heat to securing member 5 and the cable positioned in the fitting and section 1 then shrunk into engagement with the cable via heat being applied thereto.

FIGS. 5–7 illustrate sealing and strain-relief fitting Fa which is an embodiment of fitting F. The only difference fitting F and fitting Fa is that securing member 5a is segmented and not continuous so that securing member 5a can be made thicker to provide a stronger securing member. The segments of securing member 5a engage the one side of the mounting member 4a along the lengths thereof when heat is applied thereto thereby providing a strong connection between flange 2a and these segments. The sealing material 6a abets the adherence of surface 3a and the segments thereby provide a strong and sealed connection onto the mounting member and the cable 8a.

The present invention has been described in accordance with providing sealing and strain-relief for electrical cables; however, the invention is not restricted to electrical cables but can be used on pipes or other tubular members. Also, sections 2 or 2a may, after being molded, be reduced in size so that when heat is applied thereto, it will increase in size to fit in various sizes of wall openings.

The invention is claimed in accordance with the following:

1. A fitting made of heat-shrinkable material for sealing a tubular or conductor member within an opening in a wall, said fitting comprising a first section and a second section, said first section having flange means for engagement with one surface of the wall and a portion having heat-shrinkable characteristics, said portion extending in a normal manner substantially parallel with respect to a longitudinal axis of said fitting and being adapted to be passed through thee wall opening and upon hat being applied thereto to move into engagement with another surface of the wall, said second section having heat-shrinkable characteristics and being of an expanded diameter larger than the diameter of the tubular or conductor member so as to freely receive the tubular or conductor member therein, said second section, when heat is applied thereto, being shrunk into engagement with the tubular or conductor member.

2. A fitting according to claim 1 wherein said portion is annular.

3. A fitting according to claim 1 wherein said portion has a plurality of segments.

4. A fitting according to claim 1 wherein sealing means is disposed along the inside of said second section and along the outside of said flange and said portion to provide sealed engagement with the wall and the tubular or conductor member.

5. A method of making a wall-mounting fitting comprising the steps of: molding said fitting from heat-shrinkable material and having a tubular section and a wall-engaging section provided with a first portion and a second portion, expanding said tubular section to a diameter greater than its original diameter, and stretching said second portion outwardly from said first portion so that it is disposed substantially parallel with respect to a longitudinal axis of said fitting.

6. A method according to claim 5 which comprises the additional step of applying sealing material along the inside of said tubular section and along the outside of said wall-engaging section.

7. A method of mounting a tubular member through an opening of a wall via a fitting made of heat-shrinkable material and having an expanded tubular-engaging section and a wall-engaging section provided with first portion and a stretched second portion, said method comprising the steps of: inserting said stretched second portion through said opening, applying heat to said second portion causing said second portion to move against one side of said wall thereby moving said first portion against the other side of said wall to secure said fitting on said wall, positioning said tubular member in said tubular-engaging section, and applying heat to said tubular-engaging section causing said tubular-engaging section to shrink onto an area of said tubular member.

8. A method of mounting a tubular member through an opening of a wall via a fitting made from heat-shrinkable material and having an expanded tubular-engaging section and a wall-engaging section provided with a first portion and a stretched second portion, said method comprising the steps of: positioning said tubular member in said fitting, applying heat to said tubular section causing said tubular section to shrink onto an area of said tubular member, inserting said second portion through said opening, and applying heat to said second portion causing said second portion to move against one side of said wall thereby moving said first portion against the other side of said wall to secure said fitting on said wall.

References Cited

UNITED STATES PATENTS

| | | | |
|---|---|---|---|
| 2,664,458 | 12/1953 | Rapata. | |
| 2,838,789 | 6/1958 | Pazandak. | |
| 2,994,933 | 8/1961 | Wolfe | 24—141 |
| 3,099,057 | 7/1963 | Cook | 24—141 |
| 3,162,411 | 12/1964 | Duggan | 248—56 |
| 3,243,835 | 4/1966 | Armentrout et al. | 16—2 |
| 3,285,551 | 11/1966 | Tschanz | 248—56 |
| 3,423,518 | 1/1969 | Weagant. | |

LARAMIE E. ASKIN, Primary Examiner

U.S. Cl. X.R.

29—447; 248—56; 277—178; 285—159